(12) United States Patent
Rae

(10) Patent No.: US 6,816,328 B2
(45) Date of Patent: Nov. 9, 2004

(54) PSEUDO-SYNCHRONOUS INTERPOLATED TIMING RECOVERY FOR A SAMPLED AMPLITUDE READ CHANNEL

(75) Inventor: James Wilson Rae, Rochester, MN (US)

(73) Assignee: Infineon Technologies North America Corp., San Jose, CA (US)

(*) Notice: Subject to any disclaimer, the term of this patent is extended or adjusted under 35 U.S.C. 154(b) by 248 days.

(21) Appl. No.: 09/882,084

(22) Filed: Jun. 13, 2001

(65) Prior Publication Data

US 2002/0021519 A1 Feb. 21, 2002

Related U.S. Application Data

(60) Provisional application No. 60/212,903, filed on Jun. 20, 2000.

(51) Int. Cl.[7] .................................................. G11B 5/09
(52) U.S. Cl. .............................. 360/51; 360/46; 360/39
(58) Field of Search ............................ 360/51, 53, 46; 375/341, 376; 358/142

(56) References Cited

U.S. PATENT DOCUMENTS

| | | | | |
|---|---|---|---|---|
| 5,093,723 A | * | 3/1992 | Yang ........................... | 348/475 |
| 5,696,639 A | | 12/1997 | Spurbeck et al. | |
| 5,835,295 A | * | 11/1998 | Behrens ........................ | 360/51 |
| 5,917,668 A | | 6/1999 | Behrens et al. | |
| 5,943,369 A | | 8/1999 | Knutson et al. | |
| 6,021,011 A | | 2/2000 | Behrens et al. | |
| 6,028,727 A | | 2/2000 | Vishakhadatta et al. | |
| 6,111,712 A | | 8/2000 | Vishakhadatta et al. | |
| 6,307,696 B1 | * | 10/2001 | Bishop et al. ................. | 360/51 |

FOREIGN PATENT DOCUMENTS

| | | |
|---|---|---|
| EP | 0618574 | 10/1994 |
| EP | 0777211 | 6/1997 |
| JP | 61189093 | 8/1986 |

OTHER PUBLICATIONS

IEEE Publication, Aug. 6, 1997. "Interpolated Timing Recovery for Hard Disk Drive Read Channels"; Spurbeck et al., pp. 1618–1624.*

(List continued on next page.)

Primary Examiner—David Hudspeth
Assistant Examiner—Glenda P Rodriguez
(74) Attorney, Agent, or Firm—Fish & Richardson P.C.

(57) ABSTRACT

Systems and methods for reading information stored on a magnetic medium are described. Data symbols are generated from a signal encoded at a baud rate with data including an acquisition preamble defining an acquisition frequency and an acquisition phase. The system includes an inventive dual loop synchronizer that is optimized to improve the operating efficiency and reduce the overall latency of the read channel. In one aspect, the dual loop synchronizer includes a frequency synchronization loop, a signal sampler, an interpolator, and a phase synchronization loop. The frequency synchronization loop is configured to generate a sampling clock synchronized approximately to the acquisition frequency and the acquisition phase of the encoded data signal. The signal sampler is coupled to the frequency synchronization loop and is configured to sample the encoded data signal in response to the sampling clock to produce a plurality of data samples. The interpolator is coupled to the frequency synchronization loop and is configured to produce in response to the sampling clock interpolated samples from the data samples. The phase synchronization loop is coupled to the interpolator and is configured to synchronize the interpolator to the baud rate of the encoded data signal. In another aspect, the frequency synchronization loop includes a delay-locked loop configured to synthesize the sampling clock.

29 Claims, 5 Drawing Sheets

OTHER PUBLICATIONS

Infineon Technologies AG, "Infineon Technologies Launches Integrated CMOS Read–Channel IC Chipset for System–on–Chip Performance in Hard Disk Drives", Internet Article<URL: http://www.infineon–ncs.com/articles/May 15, 2000 Read Channel PressRelease.pdf> .

M. Spurbeck et al., "Interpolated Timing Recovery for Hard Disk Drive Read Channels", *IEEE International Conference on Communications ICC*, vol. 3, pp. 1618–1624 (Jun. 8, 1997).

* cited by examiner

PSEUDO-SYNCHRONOUS INTERPOLATED TIMING RECOVERY FOR A SAMPLED AMPLITUDE READ CHANNEL

CROSS-REFERENCE TO RELATED APPLICATIONS

This application claims priority to Provisional U.S. Application Ser. No. 60/212,903, filed Jun. 20, 2000.

TECHNICAL FIELD

This invention relates to systems and methods for reading information stored on a magnetic medium.

BACKGROUND

In a magnetic disk storage system, a read channel extracts information stored on a magnetic disk and delivers that information to a host system (e.g., a computer). The magnetic disk is formatted with a plurality of concentric data tracks, each of which is configured to store a fixed quantity of data in the form of magnetic transitions on the disk surface. A spindle motor rotates the magnetic disk and a magnetic transducer positioned adjacent to the disk senses the magnetic transitions on the disk surface and produces an input read signal corresponding to the recorded data. The read channel includes a plurality of components for reconstructing the recorded data from the input read signal received from the transducer. Sampled amplitude read channels include components (e.g., a digital wave shaping circuit and a digital filter) for equalizing the input read signal into a predetermined partial response (e.g., PR4 or EPR4) that enables the output of the read channel to be approximated as a linear combination of time delayed pulses modulated by a binary sequence.

Before a sampled amplitude read channel can detect and decode the data symbols encoded in the data signal being read from a magnetic disk, the data samples must be synchronized to the baud rate (i.e., the rate at which data was written to the magnetic medium). Some read channels include a single sampling timing recovery loop that synchronizes a sampling clock to the baud rate by minimizing an error between the data samples and estimated sample values. Other read channels (e.g., the sampled amplitude read channel described in U.S. Pat. No. 5,696,639) include a single interpolating timing recovery loop that synchronizes asynchronously sampled data values to produce interpolated sample values that are approximately synchronized to the baud rate.

SUMMARY

The invention features a system and a method for reading information stored on a magnetic medium by generating data symbols from a signal encoded at a baud rate with data including an acquisition preamble defining an acquisition frequency and an acquisition phase. The system includes an inventive dual loop synchronizer that is optimized to improve the operating efficiency and reduce the overall latency of the read channel.

In one aspect of the invention, the dual loop synchronizer includes a frequency synchronization loop, a signal sampler, an interpolator, and a phase synchronization loop. The frequency synchronization loop is configured to generate a sampling clock synchronized approximately to the acquisition frequency and the acquisition phase of the encoded data signal. The signal sampler is coupled to the frequency synchronization loop and is configured to sample the encoded data signal in response to the sampling clock to produce a plurality of data samples. The interpolator is coupled to the frequency synchronization loop and is configured to produce in response to the sampling clock interpolated samples from the data samples. The phase synchronization loop is coupled to the interpolator and is configured to synchronize the interpolator to the baud rate of the encoded data signal.

In another aspect of the invention, the frequency synchronization loop comprises a delay-locked loop configured to synthesize the sampling clock.

Embodiments may include one or more of the following features.

The delay-locked loop preferably comprises a phase detector and a filter coupled in series and configured to control signal propagation delay through the delay-locked loop. A fixed frequency signal generator preferably is coupled to the delay-locked loop. A feedback loop may be coupled between an output of the signal sampler and an input of the frequency synchronization loop. The feedback loop preferably comprises a phase detector configured to generate a phase error signal based upon the difference between estimated samples and the data samples. The feedback loop preferably also comprises a loop filter configured to filter the phase error signal to produce a filtered phase error signal operable to synchronize the synthesized sampling clock approximately to the acquisition frequency of the encoded data signal.

The phase synchronization loop may comprise a phase detector configured to generate a phase error signal based upon the difference between estimated samples and the data samples. The phase synchronization loop may be configured to time-shift the response of the interpolator. The phase synchronization loop preferably comprises a memory storing a plurality of sets of coefficients, wherein each coefficient set defines an interpolator response shifted in time relative to the other coefficient sets. The phase synchronization loop may be configured to time-shift the interpolator response by only a fraction of a sampling clock period. A phase calibrator may be coupled between the frequency synchronization loop and the phase synchronization loop and may be configured to calibrate the frequency synchronization loop after an accumulation of phase errors generated by the phase detector of the phase synchronization loop exceeds a threshold value. The phase calibrator may be configured to calibrate the frequency synchronization loop by adjusting the sampling clock phase or the sampling clock frequency, or both. The phase calibrator preferably comprises a feedback isolator for approximately canceling a phase transient generated at the phase synchronization loop as a result of a frequency synchronization loop calibration.

The frequency synchronization loop may be configured to fix the sampling clock frequency before the signal sampler has sampled the entire acquisition preamble of the encoded data signal. The phase synchronization loop may be configured to synchronize the interpolator during and after the signal sampler has sampled the entire acquisition preamble of the encoded data signal.

Among the advantages of the invention are the following.

By synchronizing the data samples to the baud rate with two separate control loops, each of which is optimized for operation during particular periods of each read cycle, the overall read channel latency (e.g., the latency generated by any analog-to-digital converters and any finite impulse response filters) may be significantly reduced. Furthermore, the invention improves the synchronization accuracy of the read channel while reducing the complexity of the components needed to synchronize the data samples to the baud rate. Also, because the frequency synchronization loop approximately synchronizes the data samples to the baud rate, the phase synchronization loop need only cover a limited interpolation window (e.g., ±25% of a bit period, or less). This allows the design of the associated interpolation filter, which equalizes the data samples to a predetermined spectrum, to be significantly simplified.

Other features and advantages of the invention will become apparent from the following description, including the drawings and the claims.

DETAILED DESCRIPTION

Figure 1A:
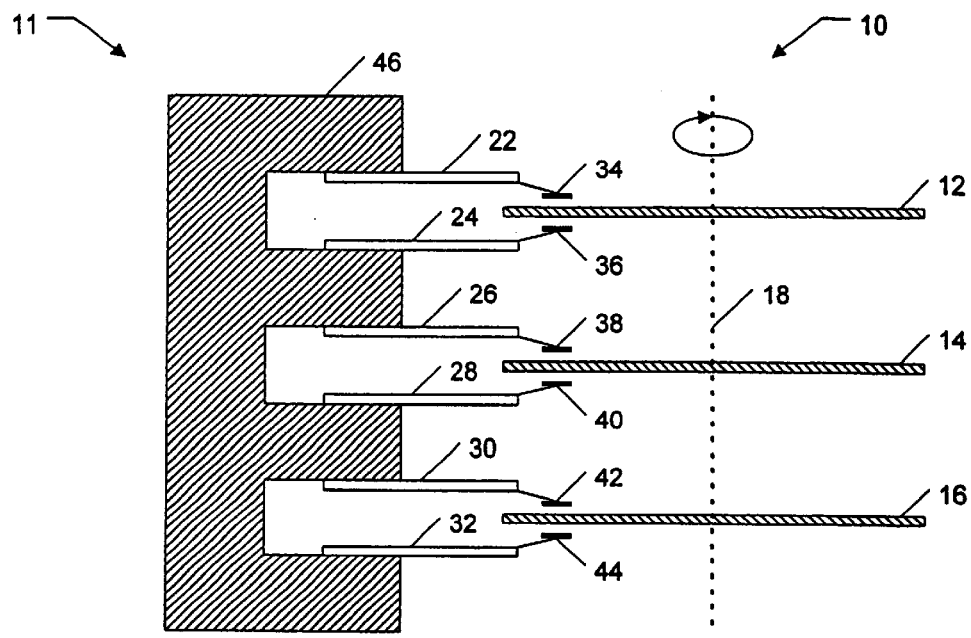
FIG. 1A is a diagrammatic side view of a magnetic disk storage system, including an actuator assembly, a plurality of magnetic storage disks, and a plurality of head supports each of which is coupled to a respective read/write transducer.
Figure 1B:
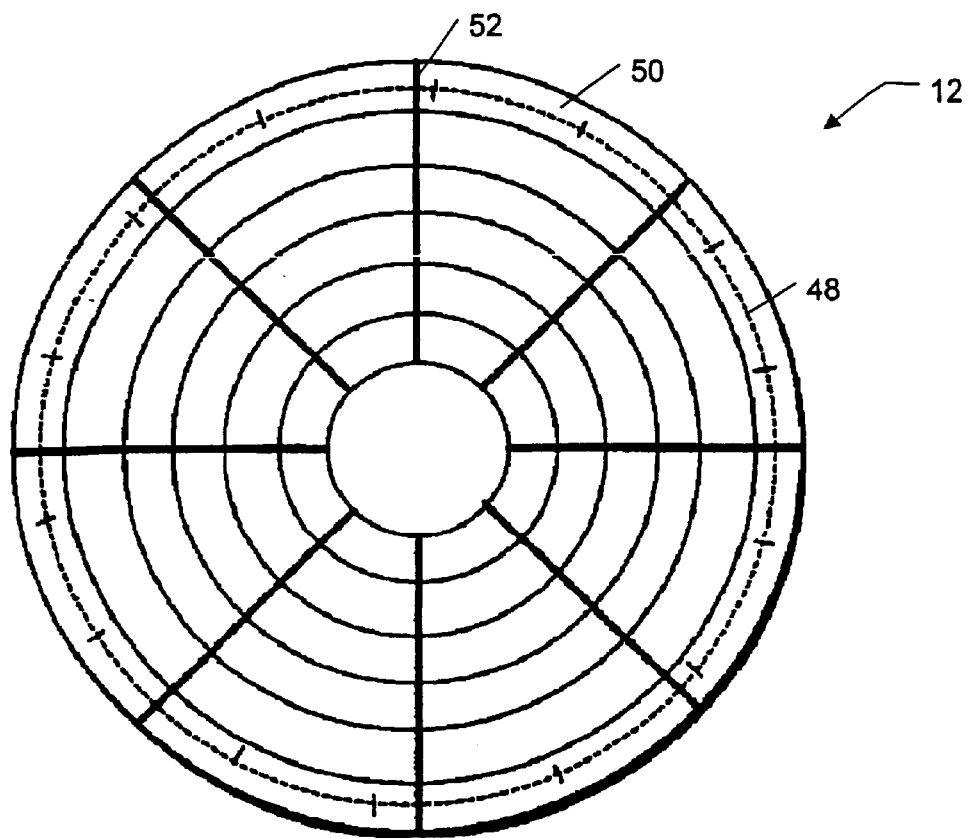
FIG. 1B is a diagrammatic top view of a formatted magnetic storage disk.
Figure 1C:
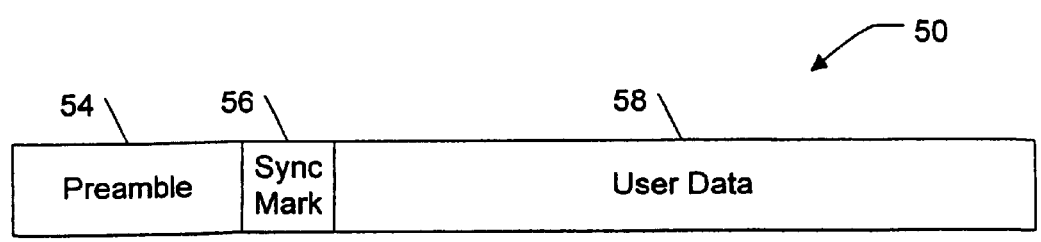
FIG. 1C is a diagrammatic view of a data symbol format of a sector of the magnetic storage disk of FIG. 1B.

Referring to FIGS. 1A–1C, a magnetic disk storage system 10 includes a head stack assembly 11 and a plurality of magnetic storage disks 12, 14 and 16, each of which is configured to rotate about an axis 18. Head stack assembly 11 includes a plurality of head supports 22, 24, 26, 28, 30 and 32, each of which is coupled by a gimbal mechanism to a respective slider 34, 36, 38, 40, 42 and 44. Each slider 34–44 supports one or more magnetic read/write transducers (e.g., magnetoresistive heads) that are operable to write data to and read data from magnetic storage disks 12–16. Slider movement is controlled by an actuator assembly 46 that controls the positions of head supports 22–32. Head supports 22–32 are configured to bias sliders 34–44 against the surfaces of disks 12–16. The rotation of disks 12–16 produces air bearings between sliders 34–44 and the surfaces of disks 12–16 that lift sliders 34–44 above the surfaces of disks 12–16 by a small, approximately constant distance.

As shown in FIGS. 1B and 1C, each magnetic storage disk 12–16 stores information in magnetic recording media supported on the disk surfaces. The information typically is stored in an annular pattern of concentric data tracks 48. Each data track 48 is formatted into a plurality of sectors 50 separated by servo fields 52. As a disk rotates, data stored in different sectors of the disk may be accessed by moving a slider to the appropriate locations on the disk surface. Servo fields 52 are used to verify the track and sector positions of transducers 34–44 and to align transducers 34–44 with a particular data track 48. In a fixed block architecture, each data track 48 is divided into a predetermined number of equal-sized sectors 50. Each data sector 50 typically has an associated identification (ID) field that contains a data sector identifier and other information (e.g., flags that identify defective sectors). Typically, data sectors 50 are identified by a logical block number. The host computer sends a list of logical block numbers to be written or read, and a disk drive controller converts the logical block number information into zone, cylinder, head and sector values. The servo system locates the desired zone, cylinder and head, and the disk drive begins reading the sector ID fields until a match is found. After the appropriate sector ID field has been read, the disk drive reads data from (or writes data to) a user data block in the sector corresponding to the matched sector ID field. As shown in FIG. 1C, each sector 50 is formatted into a data sequence that includes an acquisition preamble 54, a sync mark 56, and a user data block 58. Acquisition preamble 54 is used to set the sampling frequency and the phase of the read channel, and sync mark 56 is used to identify the beginning of user data block 58.

Figure 2:
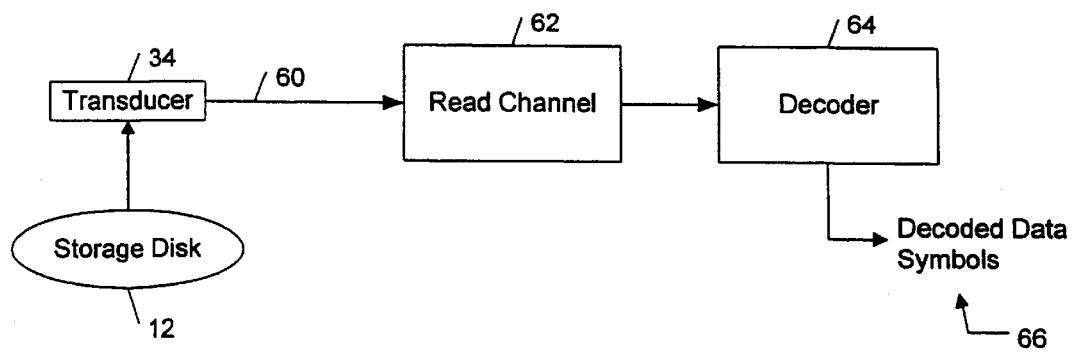
FIG. 2 is a block diagram of the magnetic disk storage system of FIG. 1A, including a read channel and a decoder.

Referring to FIG. 2, in one embodiment, transducer 34 generates an encoded data signal 60 from localized magnetic fields stored on magnetic storage disk 12. Transducer 34 transmits encoded data signal 60 to a read channel 62, which extracts encoded data symbols from encoded data signal 60. The extracted data symbols, along with other information, are transmitted to a decoder 64, which generates decoded data symbols 66 from the information received from read channel 62. As explained in detail below, read channel 62 includes an inventive dual loop synchronizer that includes a frequency synchronization loop and a phase synchronization loop, both of which are optimized to improve the operating efficiency and reduce the overall latency of the read channel.

Figure 3:
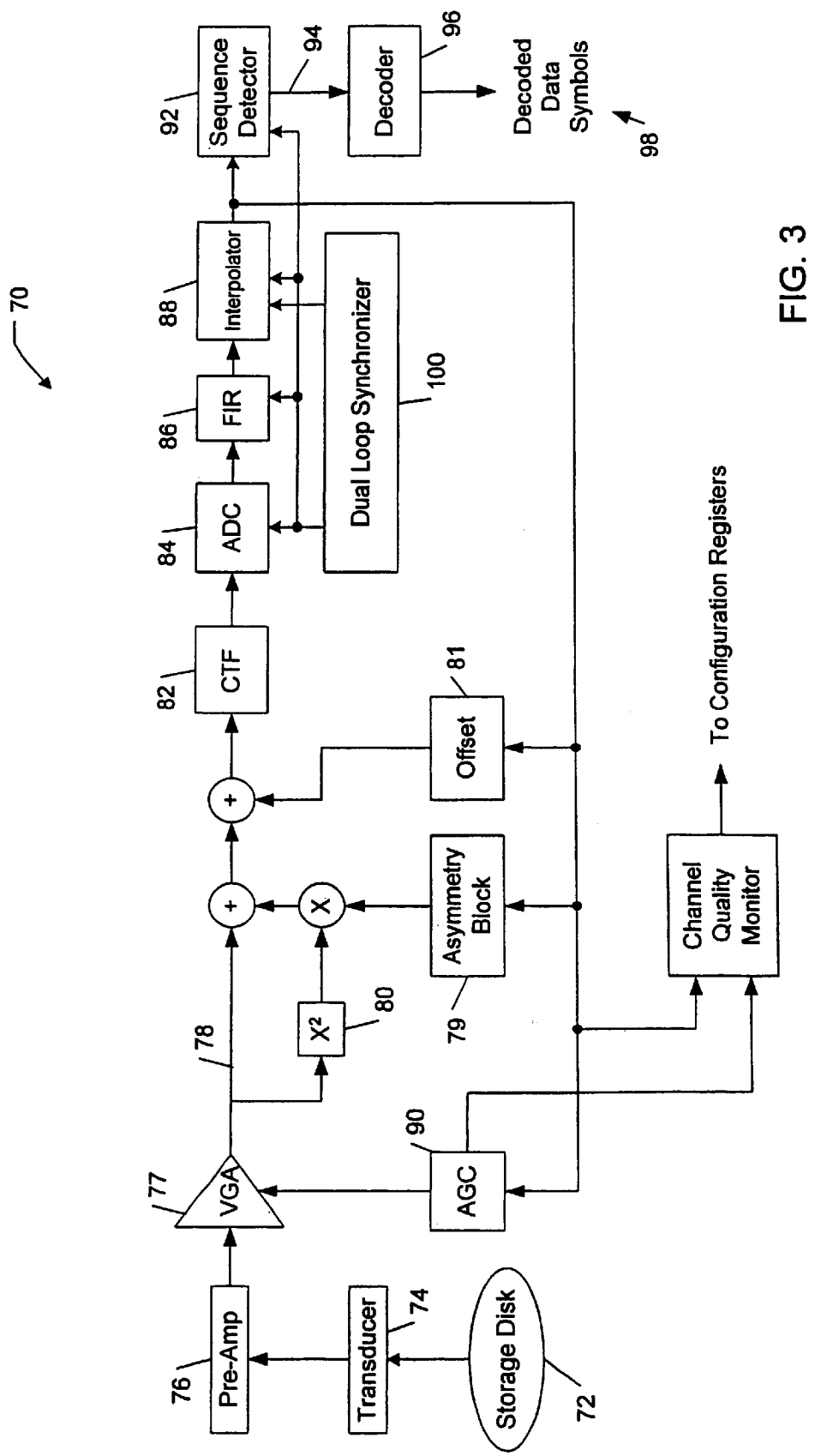
FIG. 3 is a block diagram of an EPRML read channel, including a dual loop synchronizer.

Referring to FIG. 3, in one embodiment, a magnetic disk storage system includes an EPRML read channel 70, a rotating magnetic storage disk 72, and a transducer 74. Transducer 74 may be positioned by rotary voice coil actuator operating within a closed loop servo that includes a slider carrying transducer 74 for reading information from (and writing information to) storage disk 72. In a read mode of operation, magnetic flux transitions are induced in a read element of transducer 74 to produce an encoded data signal that is applied to an input of a read preamplifier 76. A variable gain amplifier (VGA) 77 controllably amplifies the encoded data signal to produce a gain-normalized data signal 78. An asymmetry block 79 and a multiplier 80 symmetrize data signal 78, and an offset circuit 81 adjusts the DC offset of data signal 78. An equalizer 82 (e.g., a continuous time filter (CTF)) is configured to provide some (or all) of the equalization to the gain-normalized data signal 78. A signal sampler 84 (e.g., an analog-to-digital converter (ADC)) samples the equalized data signal 78 approximately at the baud rate to provide approximately synchronous discrete-time samples of the data signal. A discrete-time finite impulse response (FIR) filter 86 receives and further equalizes the samples to a predetermined spectrum (e.g., PR4, EPR4, or EEPR4). The equalized spectrum is then applied to an input of an interpolator 88 (e.g. an interpolated timing recovery filter), which is configured to produce time-shifted synchronous samples by digital interpolation of the approximately synchronous sample stream received from FIR filter 86. The equalized spectrum also is applied to an input of an automatic gain controller (AGC) 90, which adjusts VGA 77 to normalize the gain of data signal 78. The interpolated samples are analyzed by a sequence detector 92 that is configured to produce detected data samples 94 representing a maximum likelihood sequence estimate of read channel 70. Detected data samples 94 are supplied to the input of a decoder 96, which decodes data samples 94 into decoded data symbols 98.

As explained in detail below, read channel 70 further includes a dual loop baud rate synchronizer 100 that synchronizes ADC 84 approximately to the acquisition frequency and the acquisition phase defined in the encoded data signal read from storage disk 72, and synchronizes interpolator 88 to the baud rate of the encoded data signal. In particular, a frequency synchronization loop 102 synchronizes the sampling clock to the baud rate with a predefined level of accuracy. A phase synchronization loop 104 completes the synchronization of the data samples to the baud rate by time-shifting each sample in accordance with a prescribed phase error minimization protocol. By synchronizing the data samples to the baud rate with two separate control loops, each of which is optimized for operation during particular periods of each read cycle, the overall latency of read channel 70 may be significantly reduced. Furthermore, this approach improves the synchronization accuracy while reducing the complexity of the components needed to synchronize the data samples to the baud rate.

Figure 4:
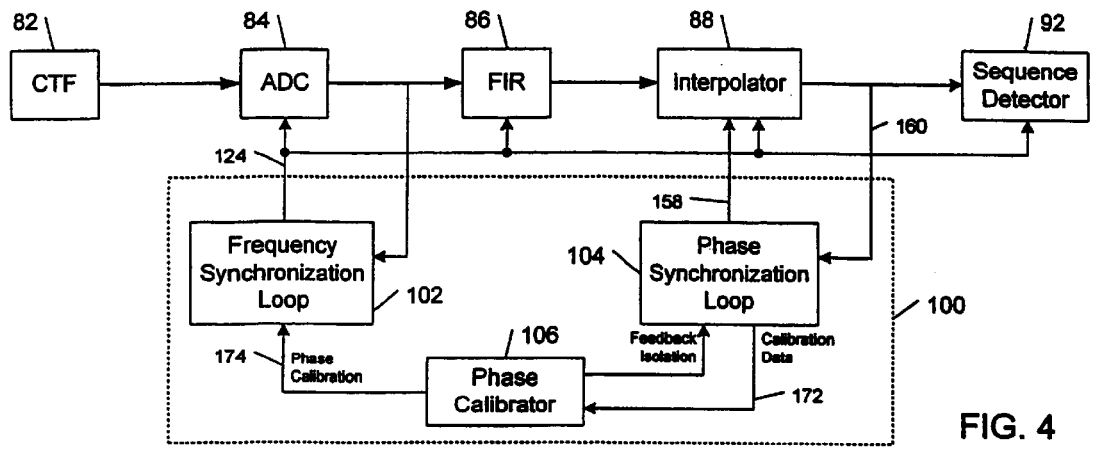
FIG. 4 is a block diagram of the dual loop synchronizer of FIG. 3.

As shown in FIG. 4, synchronizer 100 includes a frequency synchronization loop 102, a phase synchronization loop 104, and a phase calibrator 106 coupled between frequency synchronization loop 102 and phase synchronization loop 104. Frequency synchronization loop 102 operates in a fast-acquire mode to synchronize the sampling frequency approximately to the acquisition frequency and the acquisition phase defined in the acquisition preamble of the encoded data signal being read from the magnetic medium. Phase synchronization loop 104 operates in the fast acquire mode to reduce the phase error and substantially synchronize interpolator 88 to the baud rate. Phase synchronization loop 104 also operates in a data-tracking mode to continuously set the phase of interpolator 88 to produce interpolated sample values from which data symbols may be detected and decoded. Phase calibrator 106 operates in the data-tracking mode to compensate for small frequency acquisition errors caused by the inherent granularity with which frequency synchronization loop 102 synthesizes sampling clock 124. As explained in detail below, phase calibrator 106 includes a feedback isolator that approximately cancels any phase transients generated at interpolator 88 as a result of the frequency adjustments of frequency synchronization loop 102.

Figure 5A:
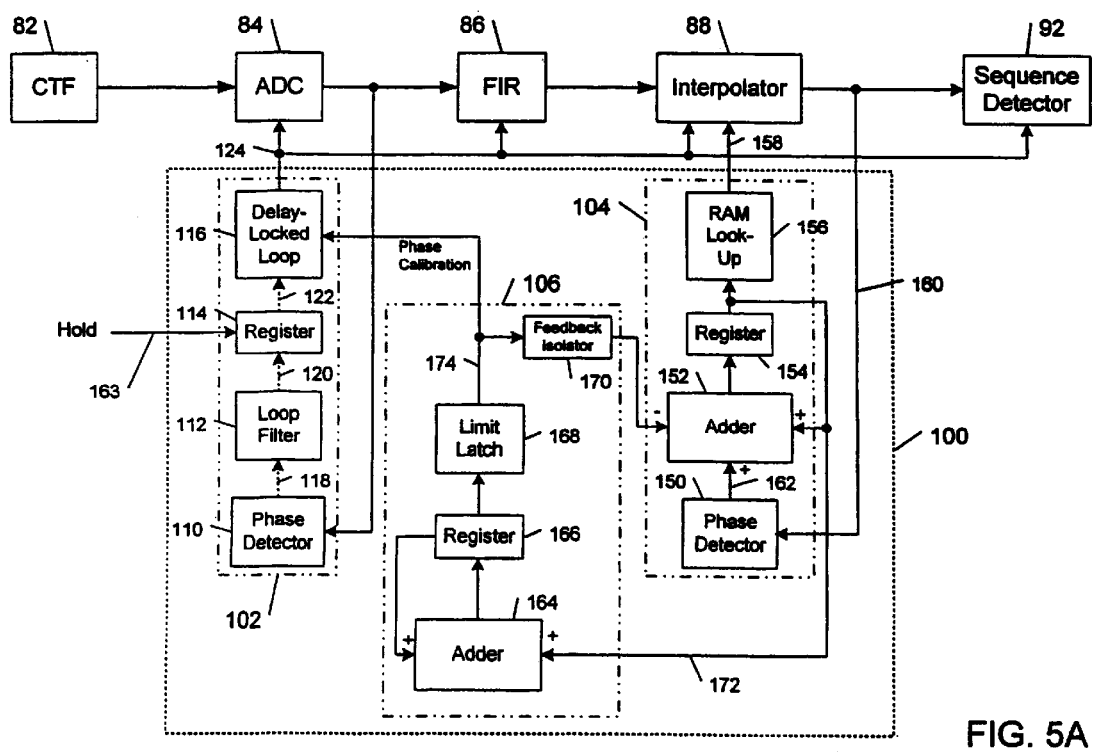
FIG. 5A is a detailed block diagram of one implementation of the dual loop synchronizer of FIG. 4, including a delay-locked loop frequency synthesizer.

Referring to FIG. 5A, in one embodiment, synchronizer 100 is implemented as follows.

Frequency synchronization loop 102 generates a sampling clock 124 that is synchronized approximately to the acquisition frequency and the acquisition phase defined in the acquisition preamble of the encoded data signal being read from the magnetic storage medium. Frequency synchronization loop 102 includes a phase detector 110, a loop filter 112, a register 114, and a delay-locked loop 116. Phase detector 110 may be a phase frequency detector or a stochastic gradient phase error estimator optimized for sine wave input waveforms. Phase detector 110 minimizes the mean squared error between estimated samples and the data samples from ADC 84 to generate a phase error signal 118. Loop filter 112 is a digitally synthesized integrator-zero combination with a type-II phase-locked loop characteristic that controls the dynamics of frequency synchronization loop 102. In particular, the coefficients of loop filter 112 are selected to achieve a desired transient response and tracking quality. For example, in one embodiment, the bandwidth of loop filter 112 is selected to be relatively wide to achieve a fast transient response. A filtered phase error signal 120 from loop filter 112 is loaded into register 114 to produce a frequency selection signal 122, which is applied to the input of delay-locked loop 116.

Figure 5B:
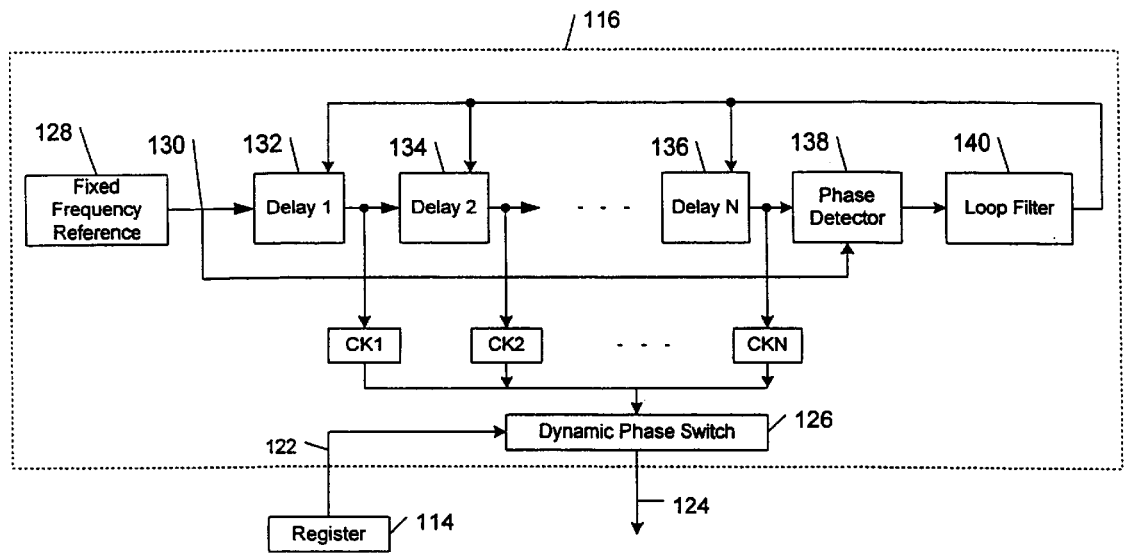
FIG. 5B is a block diagram of the delay-locked loop frequency synthesizer of FIG. 5A.

As shown in FIG. 5B, frequency selection signal 122 controls a dynamic phase switch 126 that is configured to synthesize sampling clock 124 by combining a plurality of phase-shifted clocking signals (CK1, CK2, ..., CKN). A variable frequency oscillator (VFO) 128 generates a fixed frequency reference signal 130 to produce the plurality of phase-shifted clocking signals (CK1, CK2, ..., CKN) at the outputs of a plurality of respective delay elements 132, 134, ..., 136. A phase detector 138 and a loop filter 140 are configured to adjust each delay element 132–136 so that the cumulative delay of delay elements 132–136 is equal to one period of the reference frequency signal 130. In one embodiment, VFO 128 generates a fixed reference frequency of 500 MHz, and thirty-two delay elements 132–136 generate thirty-two phases at the reference frequency, with each phase separated by 0.0625 nanoseconds. Dynamic phase switch 126 enables a wide range of sampling clock frequencies to be synthesized, and enables sampling clock 124 to be programmed with well-defined phase jumps. However, as mentioned above, because of the inherently granular way in which delay-locked loop synthesizes frequencies, sampling clock 124 can only approximate the baud rate of the encoded data signal being read from storage disk 72. The resulting synthesized sampling clock 124 is used to clock ADC 84, FIR 86, interpolator 88 and sequence detector 92.

Referring back to FIG. 5A, phase synchronization loop 104 synchronizes the phase of interpolator 88 to the encoded data signal being read from storage disk 72. Phase synchronization loop 104 includes a phase detector 150, an adder 152, a feedback register 154, and a memory 156 that stores a plurality of sets of time-shifted interpolation filter coefficients 158. Phase detector 150 is a decision-directed stochastic gradient phase error estimator optimized for random data input waveforms. Phase detector 150 measures the phase error between estimated samples and the interpolated data samples 160 from interpolator 88 to generate a phase error signals 162. Phase error signals 162 are integrated by adder 152 and feedback register 154 to produce an address for one of the sets of coefficients stored in memory 156. The sets of interpolation coefficients are stored in a lookup table in memory 156, with each coefficient set representing a fractional clock delay of interpolator 88. Feedback register 154 integrates to the time delay that minimizes the phase error between the estimated sample values and the interpolated sample values from the output of interpolator 88.

During the acquisition mode, frequency synchronization loop 102 synchronizes approximately to the acquisition frequency and the acquisition phase defined in the encoded data signal being read from the magnetic medium, and phase synchronization loop 104 completes the synchronization to the baud rate. At the end of the acquisition period, a hold signal 163 is applied to register 114 to fix the frequency of sampling clock 124. The operating frequency of sampling clock 124, however, is only approximately equal to the actual baud rate (e.g., within about ±0.1% of the baud rate). For this reason, the delay through interpolator 88 that is required to reduce the average phase error changes constantly. These errors may accumulate so that, over time, the required interpolation time shift may approach a boundary of the time-shift window defined by the sets of interpolation coefficients stored in memory 156. To prevent the required interpolation delay from falling outside of the predefined interpolation window, phase calibrator 106 is designed to periodically re-center the lookup table stored in memory 156 of phase synchronization loop 104. Phase calibrator 106 includes an adder 164 with an input coupled in the output of feedback register 154, a feedback register 166, a limit latch 168, and a feedback isolator 170. Adder 164 and feedback register 166 average the phase corrections 172 from the output of feedback register 154. The absolute average phase error accumulated in register 166 increases over time because of the difference between the synthesized sampling clock 124 and the actual baud rate. When the accumulated phase error exceeds a preset threshold, limit latch 168 produces an output pulse 174 that adjusts the phase of delay-locked loop 116 to correct the phase of frequency synchronization loop 102. The new adjusted phase propagates through ADC 84 and FIR 86, and appears at the output of interpolator 88. At the same time, output pulse 174 passes through feedback isolator 170 and adder 152 to adjust the output of feedback register 154. As a result, the required set of time-shift coefficients is closer to the nominal (or center) address value of the lookup table. Feedback isolator 170 delays the pulse by the same amount as the latency through ADC 84 and FIR 86 so that the phase adjustment signal from delay-locked loop 116 and the lookup table address change reach interpolator 88 at the same time. The delay-locked loop phase adjustments are equal and opposite to the phase adjustments of the lookup table so that any phase transients generated as a result of the lookup table re-calibration are approximately canceled.

Figure 6:
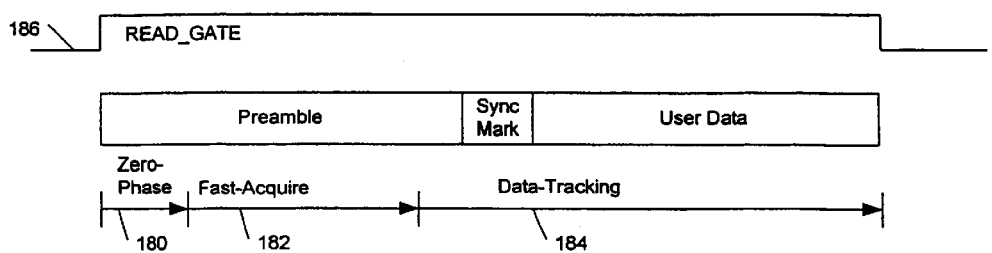
FIG. 6 is a timing diagram corresponding to different modes of operation for the read channel of FIG. 3.

Referring to FIG. 6, in one embodiment, read channel 70 reads information stored on a magnetic medium as follows. For each read cycle, the operation of read channel 70 is characterized by three periods of operation: a zero-phase period 180; a fast-acquire period 182; and a data-tracking period 184. Zero-phase period is triggered by the activation of a read gate signal 186. During zero-phase period 180, the sampling phase of frequency synchronization loop 102 is set to a predetermined value with respect to the average phase of the acquisition preamble defined in the encoded data signal being read from the magnetic medium. During fast-acquire period 182, frequency synchronization loop 102 and phase synchronization loop 104 are active. Frequency synchronization loop 102 synchronizes approximately to the acquisition frequency and the acquisition phase of the encoded data signal. Phase synchronization loop 104 adjusts the time delay of interpolator 88 to produce the time-normalized interpolated samples needed for detection. By the end of fast-acquire period 182, the frequency and phase of sampling clock 124 have been set to approximately the correct value, and the interpolation phase error has been minimized. At this point, frequency synchronization loop 102 is set to maintain a constant sampling clock frequency for the remainder of the read cycle. During data-tracking period 184, phase synchronization loop 104 completes the synchronization of the data samples to the baud rate by continuously adjusting the delay through interpolator 88. In addition, phase calibrator 106 periodically adjusts the phase of frequency synchronization loop 102 to re-center the phase adjustment lookup address stored in memory 156.

Other embodiments are within the scope of the claims. For example, in other embodiments, delay-locked loop 116 may be replaced by a phase-locked loop that includes a digitally programmed oscillator or a voltage-controlled oscillator. Furthermore, interpolator 88 may be implemented in a variety of ways. For example, the coefficients that are loaded into interpolator 88 during each cycle may be time-shifted versions of the same interpolation function, or they may be optimized individually. Interpolator 88 also may be formed from FIR structures that are configured to evaluate a polynomial, whereby changes in the polynomial argument change the resulting delay.

What is claimed is:

1. A system for reading information stored on a magnetic medium by generating data symbols from a data signal encoded at a baud rate with data on the magnetic medium, the system comprising:

a frequency synchronization loop configured to synchronize a sampling clock of a signal sampler approximately to the baud rate of the encoded data signal with a predefined level of accuracy;

the signal sampler coupled to the frequency synchronization loop and configured to sample the encoded data signal in response to the sampling clock to produce a plurality of data samples synchronized approximately to the baud rate;

a phase synchronization loop configured to synchronize a phase of an interpolator to the baud rate of the encoded data signal; and the interpolator coupled to the phase synchronization loop and configured to interpolate each of the data samples in accordance with the phase to produce interpolated data samples synchronized to the baud rate.

2. The system of claim 1, wherein the frequency synchronization loop comprises a delay-locked loop configured to synthesize the sampling clock.

3. The system of claim 2, wherein the delay-locked loop comprises a phase detector and a filter coupled in series and configured to control signal propagation delay through the delay-locked loop.

4. The system claim 3, further comprising a fixed frequency signal generator coupled to the delay-locked loop.

5. The system of claim 2, further comprising a feedback loop coupled between an output of the signal sampler and an input of the frequency synchronization loop.

6. The system of claim 5, wherein the feedback loop comprises a phase detector configured to generate a phase error signal based upon a difference between estimated samples and the data samples.

7. The system of claim 6, wherein the feedback loop comprises a loop filter configured to filter the phase error signal to produce a filtered phase error signal operable to synchronize the synthesized sampling clock approximately to the baud rate of the encoded data signal.

8. The system of claim 1, wherein the phase synchronization loop comprises a phase detector configured to generate a phase error signal based upon the difference between estimated samples and the data samples.

9. The system of claim 8, wherein the phase synchronization loop is configured to time-shift a response of the interpolator.

10. The system of claim 9, wherein the phase synchronization loop comprises a memory storing a plurality of sets of coefficients, wherein each coefficient set defines an interpolator response shifted in time relative to the other coefficient sets.

11. The system of claim 9, wherein the phase synchronization loop is configured to time-shift the interpolator response by only a fraction of a sampling clock period.

12. The system of claim 8, further comprising a phase calibrator coupled between the frequency synchronization loop and the phase synchronization loop and configured to calibrate the frequency synchronization loop after an accumulation of phase errors generated by the phase detector of the phase synchronization loop exceeds a threshold value.

13. The system of claim 12, wherein the phase calibrator is configured to calibrate the frequency synchronization loop by adjusting the phase of the sampling clock.

14. The system of claim 12, wherein the phase calibrator comprises a feedback isolator for approximately canceling a phase transient generated at the phase synchronization loop as a result of a frequency synchronization loop calibration.

15. The system of claim 1, wherein the frequency synchronization loop is configured to fix a frequency of the sampling clock before the signal sampler has sampled an entire acquisition preamble of the encoded data signal.

16. The system of claim 1, wherein the phase synchronization loop is configured to synchronize the phase of the interpolator during and after the signal sampler has sampled an entire acquisition preamble of the encoded data signal.

17. A system for reading information stored on a magnetic medium by generating data symbols from a signal encoded with data including an acquisition preamble defining an acquisition frequency and an acquisition phase, comprising:

a frequency synchronization loop coupled to a signal sampler and configured to generate a sampling clock synchronized approximately to the acquisition frequency and the acquisition phase of the encoded data signal, the frequency synchronization loop comprising a delay-locked loop configured to synthesize the sampling clock including combining a plurality of phase-shifted clocking signals; and the signal sampler configured to sample the encoded data signal in response to the sampling clock to produce a plurality of data samples synchronized approximately to the acquisition frequency and the acquisition phase of the encoded data signal.

18. The system of claim 17, further comprising a phase calibrator coupled to the frequency synchronization loop and configured to calibrate the frequency synchronization loop after an accumulation of phase errors exceeds a threshold value.

19. The system of claim 18, wherein the phase calibrator is configured to calibrate the frequency synchronization loop by adjusting the phase of the sampling clock.

20. A method of reading information stored on a magnetic medium by generating data symbols from a data signal encoded at a baud rate with data on the magnetic medium, the method comprising:

synchronizing a sampling clock of a signal sampler approximately to the baud rate of the encoded data signal with a predefined level of accuracy;

sampling the encoded data signal in response to the sampling clock to produce a plurality of data samples synchronized approximately to the baud rate;

synchronizing a phase of an interpolator to the baud rate of the encoded data signal; and interpolating each of the data samples in accordance with the phase to produce interpolated data samples synchronized to the baud rate.

21. The method of claim 20, wherein interpolating each of the data samples comprises generating a phase error signal based upon the difference between estimated samples and the data samples.

22. The method of claim 21, wherein interpolating each of data samples comprises time-shifting the data samples.

23. The method of claim 22, wherein time-shifting the data samples comprises loading into the interpolator one of a plurality of sets of coefficients, wherein each coefficient set defines an interpolator response shifted in time relative to the other coefficient sets.

24. The method of claim 22, wherein the data samples are time-shifted by only a fraction of a sampling clock period.

25. The method of claim 21, further comprising calibrating a frequency synchronization loop after an accumulation of phase errors exceeds a threshold value.

26. The method of claim 25, wherein the frequency synchronization loop is calibrated by adjusting a phase of the sampling clock.

27. The method of claim 25, further comprising approximately canceling a phase transient generated as a result of calibrating the frequency synchronization loop.

28. The method of claim 20, wherein a frequency of the sampling clock is fixed before the entire acquisition preamble of the encoded data signal has been sampled.

29. The method of claim 20, further comprising synchronizing a phase of the interpolator during and after sampling of an entire acquisition preamble of the encoded data signal.

* * * * *

UNITED STATES PATENT AND TRADEMARK OFFICE
CERTIFICATE OF CORRECTION

PATENT NO. : 6,816,328 B2
DATED : November 9, 2004
INVENTOR(S) : James Wilson Rae It is certified that error appears in the above-identified patent and that said Letters Patent is hereby corrected as shown below:

Column 10,
Line 19, after "interpolating each of" insert -- the --.

Signed and Sealed this

Twenty-eighth Day of June, 2005

JON W. DUDAS
*Director of the United States Patent and Trademark Office*